REMOTE CONTROL SYSTEM FOR TELEVISION PROGRAM DISTRIBUTION

Filed Feb. 21, 1957

4 Sheets-Sheet 1

INVENTORS
GARRARD MOUNTJOY
JOHN D. REID
BY Darby & Darby
ATTORNEYS

REMOTE CONTROL SYSTEM FOR TELEVISION PROGRAM DISTRIBUTION

Filed Feb. 21, 1957

INVENTORS
GARRARD MOUNTJOY
JOHN D. REID
BY Darby & Darby
ATTORNEYS

INVENTORS
GARRARD MOUNTJOY
JOHN D. REID
BY Darby & Darby
ATTORNEYS

INVENTORS
GARRARD MOUNTJOY
JOHN D. REID
BY Darby & Darby
ATTORNEYS 3,071,642
Patented Jan. 1, 1963

3,071,642

REMOTE CONTROL SYSTEM FOR TELEVISION PROGRAM DISTRIBUTION

Garrard Mountjoy and John D. Reid, Little Rock, Ark., assignors to AR & T Electronics, Inc., North Little Rock, Ark., a corporation of Arkansas Filed Feb. 21, 1957, Ser. No. 641,643
16 Claims. (Cl. 178—5.1)

The present invention relates to a control system for controlling the distribution of television programs to subscribers in a closed circuit television distribution system. The invention relates more particularly to such a control system which is adapted to collect coins prior to the viewing of a television program and which records which programs are viewed and which may be remotely controlled by the central distribution station.

Much effort has been expended in developing and promoting a system whereby television programs may be broadcast in such a manner that only the set owners who pay a predetermined fee will be able to watch and enjoy the program. One approach to this problem has been to broadcast a scrambled television program at the ordinary television frequencies and to provide set owners paying a predetermined fee with means to unscramble the transmitted signal. It has been proposed to provide an unscrambling signal over existing telephone wires, and it has also been proposed to provide an electrical device to be attached to the television set which is capable of unscrambling the transmitted signal and which records which programs are viewed so that the viewer may later be charged accordingly.

These previously proposed methods require that a "scrambled" television signal be broadcast over a normal television channel and hence the approval of the Federal Communications Commission is required to institute such a system. Considerable opposition exists to the use of public television channels for a limited audience rather than for the public at large, and at the present date approval of such a system has not been received. In the event that such a system is approved it will nevertheless be subjected to strict regulation by Government Agency.

The present invention is adapted for use in a television system wherein the television programs are supplied to individual subscribers by a closed circuit system utilizing coaxial cable transmission lines, for example. Since such a system does not utilize radio broadcast techniques and hence does not require the assignment of a portion of the radio frequency spectrum, these systems are not regulated by the F.C.C.

Many such closed circuit television systems are presently in operation in localities where television reception is impossible or unreliable without the use of very tall antennas which are prohibitive in cost to the individual television set owner. In such localities television programs are received from a tall community television antenna or otherwise and one or more television channels are amplified and distributed to subscribers by means of very high frequency transmission lines such as coaxial cable.

In addition to the situation where ordinary television reception is poor, the closed circuit community television system is also adaptable to apartment houses and other situations where the use of individual antennas by each set owner is impractical. Closed circuit community television systems also have advantages in quality of signal and other factors which make such systems practical apart from the particular situations described above.

Since the present invention is designed to be used with closed circuit television distribution, it also becomes feasible to provide a system which is remotely controlled from the central station. Since means must be provided to distribute the television programs, there is very little additional difficulty in distributing control signals for the purpose of setting the amounts to be charged for programs or otherwise controlling the distribution of the programs at the individual receivers.

The present invention also overcomes a serious objection to many previously proposed "pay as you go" television systems in that programs are paid for in advance by the deposit of coins. Payment in advance obviously eliminates considerable difficulty which may be encountered when it is necessary to charge the customer for programs viewed and collect the fees at some later date.

Another difficulty with previously proposed "pay as you go" television systems has been the likelihood that schemes would be devised to avoid payment and that operators of such systems would constantly be faced with a problem of operations designed to produce unscrambling devices which would allow the set owner to view the paid program without paying the required fee.

Since the system according to the present invention includes the use of a closed circuit television system, the system operator has access to the distribution equipment and may prevent tampering with the equipment or may cut off service to subscribers attempting to avoid payment by tampering with the equipment.

It is accordingly an object of the present invention to provide a remotely controlled coin operated control box for a closed circuit television distribution system.

It is another object of the present invention to provide a television distribution system having a recorder to record each paid program viewed by the individual subscriber.

It is another object of the present invention to provide a coin operated television distribution system in which the number of coins required to view a given program may be controlled by the central distribution station.

It is another object of the present invention to provide a coin operated control box for television distribution in which most of the power required for the operation of the box is provided by the subscriber's household power supply so that only a minimum amount of power need be supplied from the central station for the remote control of the distribution system.

It is still another object of the present invention to provide a coin operated control box, the operation of which cannot be prevented by manipulations of the control box such as removing the electrical plug.

It is still another object of the present invention to provide a coin operated control box for television distribution which will not accept coins of a size different than that for which the coin box is designed.

It is a further object of the present invention to provide a coin operated control box for television distribution which is of simple and inexpensive construction and which is difficult or impossible for the subscriber to tamper with without detection.

It is a further object of the present invention to provide a remote controlled switch for use in a television coin box, the switch being operated by a rotating electrical motor so that much less current is required than is the case with electromagnet operated switches.

Other objects and advantages of the present invention will be apparent from a consideration of the following description together with the appended drawings, in which FIG. 1 is a front perspective view of a control box according to the present invention;

As previously explained the control box is designed for operation with a closed circuit television distribution system where the television signal is provided to the set by a very high frequency transmission line leading from the central station to the individual subscriber's house.

In order to make the coin operated distribution system operative is necessary that the signal transmitted to the subscriber over the transmission line be such that it is not adapted to be used directly by the subscriber's television set. In other words, the signal provided is such that some operation such as frequency conversion, unscrambling or the like must be performed on the signal before it is fed to the subscriber's television set. With this condition imposed, it may easily be arranged that the coin operated control box disables a frequency converter in the receiver upon reception of a signal from a central station. At such time as the subscriber deposits the necessary number of coins to reactivate the converter unit, the television signal may be translated into a picture and sound by the normal operation of the customer's television set.

As an alternative to the converter approach explained above, the distribution control system may operate by the use of a filter or the like which blocks an otherwise usable television signal transmitted over the television transmission lines.

It is obvious that the second blocking or filtering approach is subject to some disadvantages in that it would be much easier for a subscriber to intercept the acceptable signal from the distribution system and convey it to an ordinary television set and thus avoid payment of a fee. In addition, the second alternative method is thought to be less desirable by reason of other technical considerations.

Figures 1, 2:
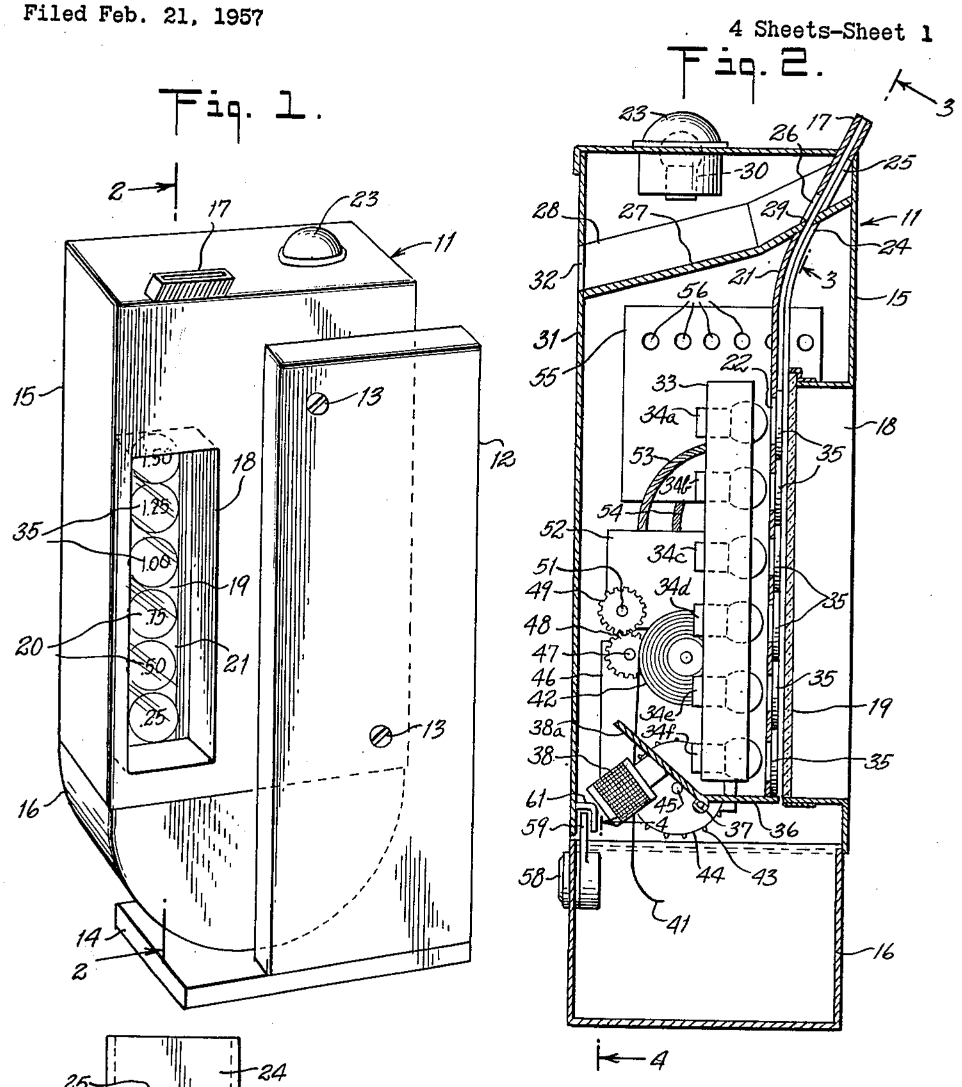
FIG. 2 is a vertical sectional view of the control box of FIG. 1 taken along the line 2—2 in FIG. 1.

Referring now to FIG. 1, a coin operated control box for television distribution is shown at 11. An upright support 12 is provided for the box 11 which is connected to the support 12 by means of screws or bolts 13. A base 14 is provided which is attached to the upright support 12 in any suitable manner. The control box 11 is comprised of two parts, a control unit 15 and the coin collection receptacle 16. A coin slot 17 is provided at the top of the box for the insertion of coins.

A recess 18 in front of the box is provided containing a window 19 which may be of glass, transparent plastic, or other suitable material. A coin chute 21 leads from the slot 17 at the top of the box so that coins 35 deposited in the slot and retained by the control unit 15 are visible in the window 19 in the front of the control box 11.

The coin chute 21 is of a width such that it will accommodate only one coin and hence successive coins placed into the slot 17 stack one on top of the other as shown in FIG. 1. By way of example, the coin operated control box shown in FIG. 1 is adapted to accept quarters although it should be understood that the box could be designed to accept coins of a different denomination or to accept tokens or the like. Numerals 20 may be painted or otherwise imprinted on the window 19 to indicate the total sum of money represented by the coins 35 stacked in the coin chute 21.

An indicator light cover 23 is provided at the top of the control box. The function of the indicator light with cover 23 will be described below in connection with the operation of the electrical circuit of the control box.

Figure 3:
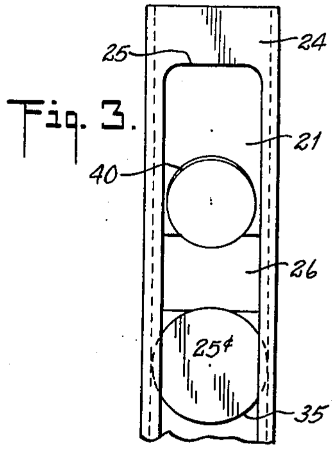
FIG. 3 is a sectional view of the coin chute of the control box taken along the line 3—3 in FIG. 2.
Figure 4:
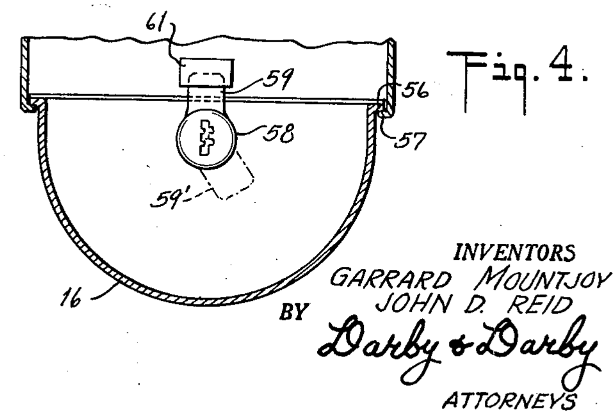
FIG. 4 is a vertical sectional view of the control box lock and a coin collection receptacle of the control box.

From FIG. 2 and also from FIG. 3 it will be seen that the front side 24 of the coin chute 21 has a cut-away portion 25 so that the width of the cut-away portion 25 is slightly less than the diameter of a quarter shown for example at 35 in FIG. 3.

The cut-away portion 25 is wider than the diameter of the next smaller coin, such as a nickel. Thus a quarter inserted into the coin slot 17 is guided by the coin chute 21 downward past the window 19 until it reaches the end of the coin chute 21. A smaller coin such as a nickel or a dime, however, will fall out of the cut-away portion 25 in the coin chute 21.

The top of the coin chute 21 is bent forward at an angle as shown in FIG. 2 thus assuring that a smaller coin such as a nickel will fall out of the coin chute by the force of gravity and will not be guided by the coin chute 21 as are the quarters 35.

In order that the small rejected coins may be guided out of the coin chute 21, an aperture 26 is provided in the back of the coin chute and a reject chute 27 leads from the front of the control box to the rear of the control box and thus captures small rejected coins dropping out of the coin chute 21. The reject chute 27 is provided with side walls 28 for guiding the rejected coins and is also provided with a slot 29 where the acepted coins such as quarters pass through the reject chute and into the control box.

The reject coin chute 27 leads to the rear wall 31 of the control box 11. Rear wall 31 is provided with a coin reject opening 32 through which the small rejected coins pass out of the control box. This particular arrangement for the rejection of small coins, while of considerable advantage because of its simplicity and effectiveness, is exemplary only and any equivalent device for the rejection of coins smaller than that for which the machine is designed could equally well be used. The coin chute in the device of FIG. 1 is designed so that coins larger than a quarter will not fit into the slot.

The method provided above for preventing the insertion of coins other than a quarter into the operating portion of the control box is preferred for its simplicity and for its inexpensive construction. It should be noted that elaborate schemes for the rejection of slugs or counterfeit coins are not necessary due to the fact that the use of slugs by a subscriber may be prevented simply by terminating his service. In fact there is no absolute necessity for any type of coin separation device whatsoever, but it is thought that the temptation to use the wrong size coins is better eliminated beforehand so that difficulty with subscribers is eliminated.

A particularly desirable feature of the present control box is provided by indicating lights in the box for indicating whether a free program or a pay program is being broadcast and also for indicating the amount of money required to view a pay program. A free program indicator lamp 30 for indicating the broadcast of a free program is provided at the top of the control box 11. The light bulb 30 is visible through the transparent light cover 23.

An indicator light bracket 33 is provided behind the window 19. Six indicator lights **34*a*, 34*b*, 34*c*, 34*d*, 34*e* and 34*f* are supported by the indicator light bracket 33. Each of the indicator lights 34 is placed behind a respective coin position in the coin chute 21. In each of these coin positions a small hole 22 of diameter somewhat less than a quarter is provided in the rear of the coin chute 21. Therefore, in the absence of a quarter at the coin position of a particular indicator light, that particular indicator light will be visible through the hole 22 in the coin chute 21**.

The purpose of the indicator lights 34 is to indicate the sum of money (that is, the number of coins) required to view a particular paid program. The manner in which the lights are controlled will be explained at a later point in connection with the explanation of the electrical circuit of the control box.

The coin receptacle 16 is held in position by a flange 57 forming a slide which engages a projection 56 on the coin receptacle. Thus the coin receptacle may be slid forward into a position enclosing the bottom of the control unit 15. A lock 58 is provided for the coin receptacle 16; the lug 59 on the lock 58 engages a slot in the bottom of the control unit 15. By inserting a key in the lock 58, the lug 59 may be rotated downward to the position shown at 59' thereby releasing the coin receptacle so that it may be slid rearwardly from beneath the control unit 15 and removed for the collection of coins.

The lug 59 on the lock 58 also engages a bracket 61 at the bottom of the rear panel 31 of the control unit 15. Thus the rear panel 31 is locked into position to prevent tampering with the control unit mechanism but may be removed for any necessary servicing by unlocking the lock 58.

A coin gate 36 is provided to close the bottom of the coin chute 21. The coin gate is pivotally mounted on a shaft 37. An electro-magnet 38 controls the coin gate 36. Actuation of the magnet 38 attracts the armature 38*a* of the gate 36 to the position shown in FIG. 2 thus retaining the gate closed against the weight of the coins 35 in the coin chute 21.

When the electromagnet 38 is deenergized the gate 36 is released and will be opened by the weight of one or more coins to release them to fall into the receptacle 16. In the absence of coins in the coin chute 21, the gate will remain in the closed position of FIG. 2 due to the weight of the armature 38*a* acting as a counterbalance.

Figure 5:
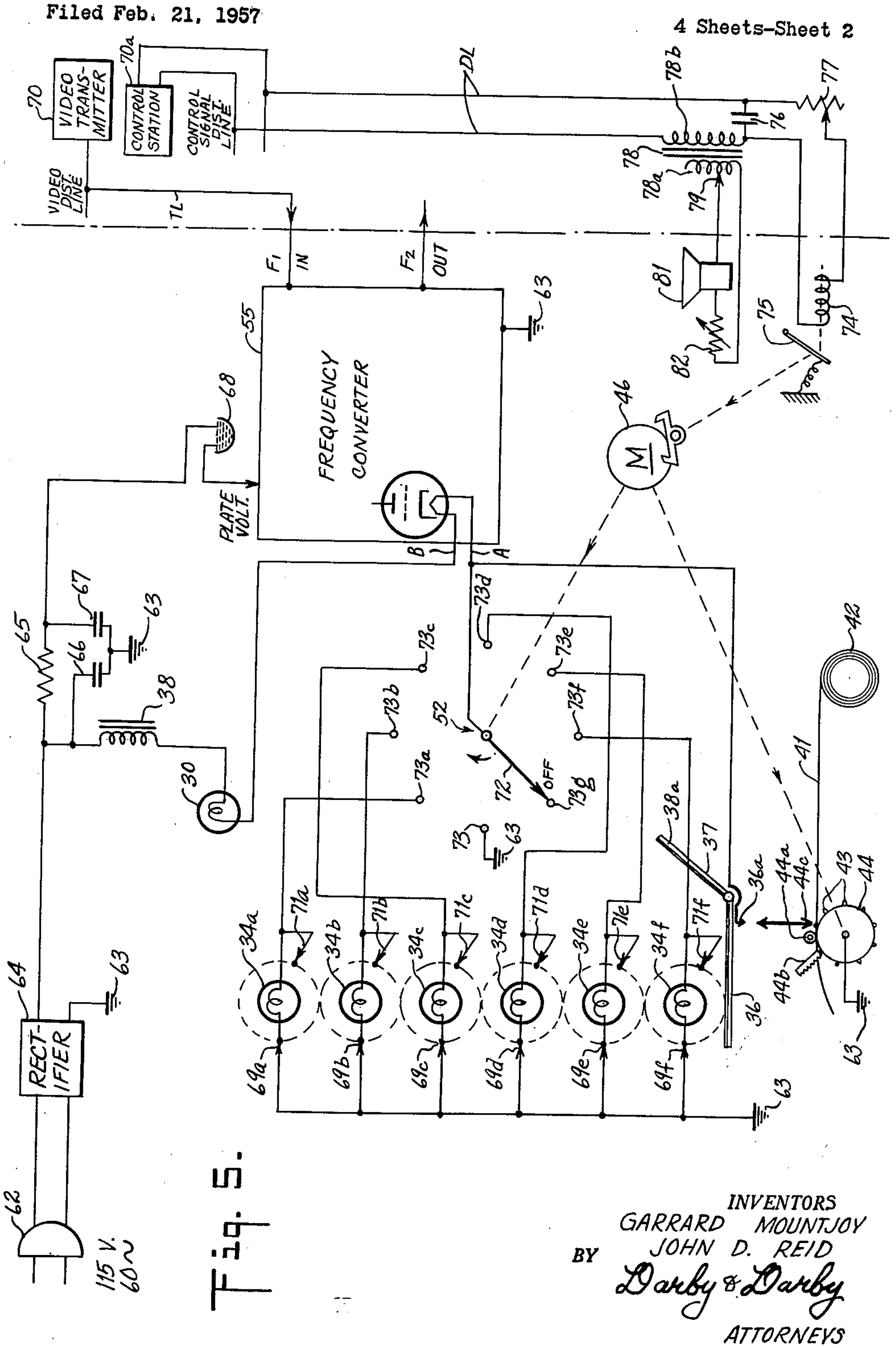
FIG. 5 is a schematic circuit diagram of the electrical circuit of the control box and control system.

The electrical and mechanical operation of the control unit will be understood by referring to FIG. 5 showing a schematic diagram of one preferred form of control unit in the distribution system. The details of the electrical connections have been omitted from FIG. 2 and only the major components of the control unit are shown in the sectional view of FIG. 2. Such elements as are shown in FIG. 2 are identified by the same reference numerals in the schematic diagram of FIG. 5.

In FIG. 5, 62 designates an electrical plug for connecting the control box to an ordinary household electrical receptacle as a suitable source of electric power. The electrical plug 62 is connected to a rectifier 64, which may be a dry disk rectifier or may be a rectifier electron tube or any other suitable rectifying device.

One output terminal of the rectifier 64 is connected to a suitable filter network consisting of a resistor 65 and condensers 66 and 67 for filtering out any power supply ripple component. The other terminal of rectifier 64 is connected to a common ground terminal 63. The filter capacitors 66 and 67 are connected between the respective ends of the filter resistor 65 and the common ground 63. The filter network therefore serves to substantially eliminate the alternating current component of the rectified current by passing it to ground through the filter condensers 66 and 67. The particular filter circuit shown is preferred for reasons which will be explained in connection with FIG. 6. However, other equivalent filter circuits could be provided in a manner which is well known in the art.

The direct voltage from the filter resistor 65 is supplied as excitation to a frequency converter 55 through a mercury spill-switch 68. It is the purpose of the mercury spill-switch 68 to prevent tampering with the control box such as by tilting, jarring or otherwise attempting to interfere with its operation. Mercury spill-switches comprise essentially a cup of mercury having two contacts inserted therein so that electrical connection is made between the two contacts by the mercury unless the switch is jarred or tilted, spilling the mercury and breaking the contact. After the mercury is spilled the contact remains broken until such time as the switch is physically reset by one of various means which may be provided for this purpose.

The purpose of the frequency converter 55 is to convert the television signal received by means of the transmission line TL from a video transmitter 70 into a signal having a frequency which will be accepted by the subscriber's television set.

The frequency converter 55 is therefore provided with an input terminal $F_1$ connected to the distribution line TL from the transmitter 70 and is adapted to receive the television signal. Frequency converter 55 is also provided with an output terminal $F_2$ for connection to the subscriber's television set. Since the mercury spill-switch 68 is in series with the plate voltage supply of the frequency converter 55 tampering with the control box will render the frequency converter inoperative and thus cut-off the subscriber's television reception. The plate circuit of the frequency converter is completed by an electrical connection from the frequency converter 55 to ground 63.

The particular type of frequency converter to be utilized in this system is not an essential part of the present invention. Many electrical circuits are known for converting a television signal comprising a video signal superimposed on a carrier of frequency $F_1$ to a substantially identical video signal superimposed on a carrier of frequency $F_2$. Frequency converters such as used to produce the intermediate frequency for IF stages in television receivers, for example, may be used.

In the present distribution system it is preferred that the television signal distributed from the transmitter have a carrier frequency of approximately 10 to 15 megacycles per second. The distributed signal may then be converted to a higher frequency (for example, 54 megacycles per second) and thus will be accepted by the subscriber's ordinary VHF television receiver when tuned to conventional broadcast channel 2 and translated into sound and picture in the normal manner.

The frequency of the distributed signal is of course, not critical and might be set at some other frequency. It is preferred, however that the distribution frequency be outside the ordinary television receiver frequency range so that an ordinary television set would not operate if supplied directly with the distributed signal. When the distribution frequency is selected in this manner the subscriber cannot receive the program simply by coupling his set directly to the distribution line and thus defraud the operator of the system.

The coin collection electromagnet 38 of the control box 11 is connected to receive the rectified current from the rectifier 64. The free program indicating lamp 30 is connected in series with the winding of the electromagnet 38. At least one tube filament or cathode heater in the frequency converter is also connected in series with the winding of the electromagnet 38 and the indicating lamp 30. This series circuit is completed by connection from one frequency converter filament terminal A to the movable arm 72 of a stepping switch 52. The fixed contact 73 of the stepping switch 52 is connected to ground 63 so that the series circuit formed by the electromagnet winding 38, the indicating lamp 30 and the frequency converter tube filament is completed when the rotary contact 72 of the stepping-switch 52 rests on the fixed contact 73.

The indicator lamp 30 is chosen so that the proper current is provided through the series circuit including the low resistance electromagnet 38, the lamp 30 and the filament of a tube of the frequency converter in order that each of the above elements will be supplied with the proper operating current. As an example, where the tube filament in the frequency converter requires a 6.3 volt, 150 milliampere supply, it was found that an ordinary 15 watt 115 volt lamp 30 would provide a proper combination.

Elements having the above characteristics were found to operate satisfactorily when the circuit to ground was completed through the stepping switch 52. The voltage applied to the lamp 30 was only slightly less than its rated voltage and hence it operated satisfactorily. The current in the circuit was approximately 150 milliamps and hence the voltage drop across the tube filament was approximately 6.3 volts as required by the tube. The electromagnet 38 is designed to operate at this same current value.

As may be seen from FIG. 5, the stepping switch 52 is provided with a number of contacts and only one of the contacts, namely contact 73, is connected directly to ground. Contact 73*g*, for example, is open so that when the rotating contact 72 is at the position shown in FIG. 5 engaging the contact 73*g*, the series circuit including the relay winding 38, the lamp 30 and the frequency converter tube filament is open. Thus when the stepping switch 52 is in the position shown in FIG. 5, the lamp 30 is not lit, the frequency converter 55 is inoperative and the electromagnet 38 is not activated.

Referring now to FIG. 2, it will be seen that the electromagnet 38 operates the coin gate 36 for the control box. The normal position of the coin gate 36 when the coin chute 21 is empty and when the electromagnet 38 is not activated is shown in FIG. 2 with the arm of the gates 36 closing the opening in the bottom of the coin chute 21 due to the fact that the weight of the armature 38*a* of the coin gate is heavier than the arm 36 and thus normally retains the gate in the closed position.

The weight of a single quarter is sufficient to over balance the armature 38*a* and open the coin gate if the electromagnet 38 is not actuated. Thus any coins inserted into the box when the electromagnet is not actuated will open the coin gate and thereby be allowed to pass into the coin receptacle 16. However, if the electromagnet 38 is actuated to produce a force on the armature 38*a* tending to hold the gate 36 closed, the maximum number of quarters acceptable by the machine will be held by the force of the electromagnet 38 and will not be allowed to drop into the coin receptacle 16.

From the foregoing explanation it will be seen that with the stepping switch 52 in the position shown in FIG. 5, any coins dropped into the control box will pass through and fall into the coin receptacle 16 since the electromagnet 38 is not energized. The contact 73*g* hence represents the off position of the stepping switch 52.

The stepping switch 52 is driven by an escapement controlled motor 46. The motor 46 produces step-by-step motion of the stepping switch 52 in response to signals from the control signal distribution station in a manner which will be described below. The motor 46 may be a spring wound motor and for example may be periodically wound by the service man who makes the collections from the control box. The spring wound motor provides an advantage in that the subscriber cannot prevent the operation of the stepping switch 52 by disconnecting the power plug 62 from his household current supply.

Figure 9:
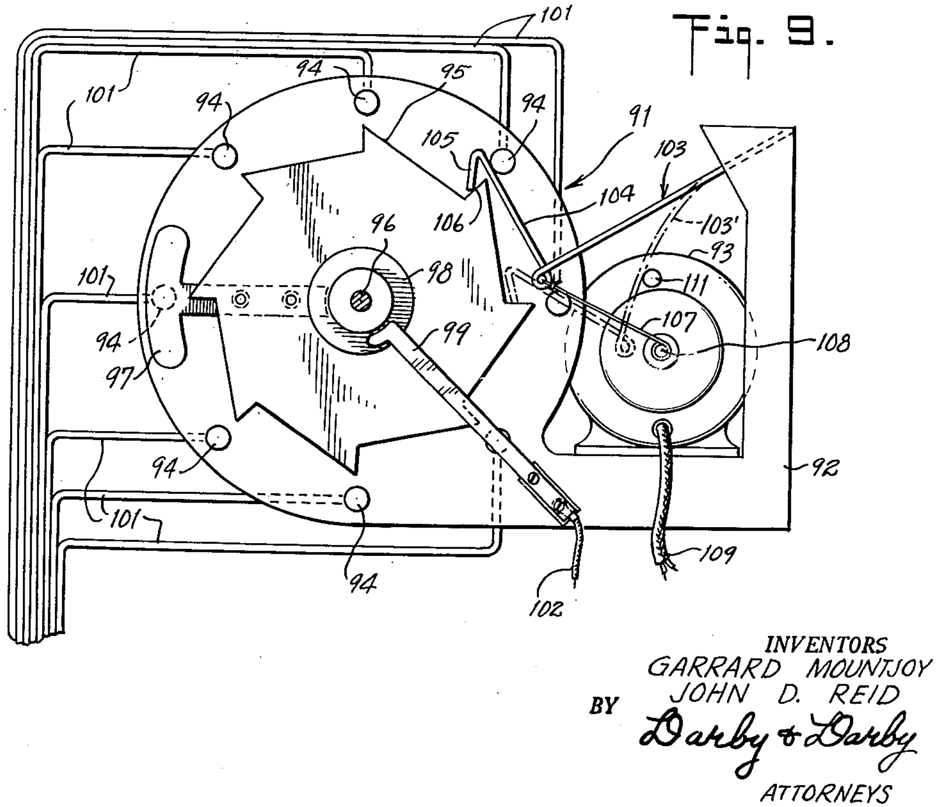
FIG. 9 is a further alternative stepping switch driven by an electric motor rather than by the escapement controlled clock motor arrangement of FIGS. 5 and 7.

Although a spring wound motor is preferred for reasons explained above, the motor 46 could be electrically powered in which case it may be desirable to provide the electrical power for the motor from the central distribution station to prevent the subscriber from disabling the movement of the stepping-switch 52. An alternative switch for the control box is shown in FIG. 9 which shows the manner in which the switch may be directly driven by an electrical signal from the central distribution station. This switch is described and explained below.

When the stepping switch 52 is rotated one step by the motor 46 in response to a control signal, the rotating contact arm 72 will move from contact 73*g* to the contact 73. As previously indicated, movement of the rotating contact 72 to engage the fixed contact 73 completes the circuit to the electromagnet 38, the lamp 30, and the frequency converter tube filament.

With the stepping switch in this position the magnet 38 is energized so that coins placed in the control box will be held by the gate 36 and prevented from sliding through to the coin receptacle 16. In addition the frequency converter will be operative so that the subscriber will be able to receive television signals transmitted from the central station. Furthermore the indicator light 30 at the top of the control box will be lit. This may be used to indicate to the subscriber that, for example, a program is available which may be viewed without the payment of a fee.

This provision for free distribution of certain television programs is a very important feature of the system. As an example, it allows the station operator to present a short preliminary program advertising a particular program which is to be broadcast. During the course of the preliminary advertising program the fee required to view the forthcoming program may be announced to the viewer. At this time the prospective viewer may deposit the necessary number of coins to view the forthcoming program. As previously explained, during the time when the stepping switch is oriented to contact 73, coins deposited in the control box will be retained by the coin gate 36. Therefore by depositing the coins preliminary to the paid program, the viewer wil be able to view the free program and the following paid program without interruption.

The manner in which the deposit of coins by the viewer causes the frequency converter to operate to allow the subscriber to view the paid program will now be described. Each of the remaining contacts 73*a*, 73*b*, 73*c*, 73*d*, 73*e*, and 73*f* of the stepping switch 52 is connected to a respective electrical contact 71*a*, 71*b*, 71*c*, 71*d*, 71*e*, and 71*f* adjacent the coin chute 21. Each of the aforesaid contacts is also connected to one terminal of a respective payment indicator light 34*a*, 34*b*, 34*c*, 34*d*, 34*e*, or 34*f*.

Each of the coin positions in front of a respective payment indicator light 34 is also provided with a second contact 69*a*, 69*b*, 69*c*, 69*d*, 69*e*, or 69*f*. Each respective pair of the contacts 69 and 71 is associated with a particular coin position and is placed so that a coin at that position makes electrical contact with both of the contacts 69 and 71 at that position. For example, a sixth coin deposited into the box would be located in the stack of coins at a position in front of the payment indicator lamp 34*a*. At this position it would be in electrical contact with both contact 69*a* and contact 71*a*. A sixth coin would therefore short circuit the lamp 34*a* and provide a direct electrical connection from ground 63 to contact 73*a*· Conversely in the absence of a coin in the coin position in front of the lamp 34*a*, the contact 73*a* would then be connected through the lamp 34*a* to ground 63.

The lamp 34*b*, contact 69*b*, contact 71*b* and stepping switch contact 73*b* are all connected in a manner corresponding to the connections of the payment indicator lamp 34*a* and its associated elements described above. The remaining payment indicator lamps 34, contacts 69 and 71, and stepping switch contacts 73, are similarly connected.

The deposit of a first coin in the control box when the magnet 38 is energized causes the coin to come to rest in front of the payment indicator light 34*f* and hence to short circuit that light thereby connecting contact 73*f* directly to ground 63. A second coin causes the same result with respect to contact 73*e*, a third coin the same result with respect to contact 73*d*, etc.

Having described electrical connections of the paid indicator lamps 34, it is now possible to describe the operation of the control box when a pay program is to be transmitted by the central distribution station. Suppose that the central distribution station desires to transmit a program for a fee of $1.50 or six quarters. In this event, the central station may transmit a single control pulse to move each subscriber's stepping switch rotating contact 72 to engage contact 73 for the distribution of a free advertising preliminary program, as previously explained.

During the course of the advertising program the subscriber may be informed that the forthcoming paid program may be viewed for a charge of $1.50 by depositing six quarters in the control box. At the conclusion of the advertising program the central control station will send a single pulse to the control boxes thereby shifting the rotating contact 72 to engage the fixed contact 73*a*.

It will be noted that at this time only the top payment indicating light 34*a* will be come lit. From FIG. 1 it may be seen that the figures 1.50 are placed on the window 19 in front of the payment indicating light 34*a* so that the lighting of payment indicating light 34*a* indicates to a subscriber that a payment of $1.50 is required to view the pay program then in progress.

It is, of course, desired that with the stepping switch oriented to contact 73*a* and no coin in the coin position in front of the lamp 34*a*, the frequency converter 55 will be inoperative and thus the subscriber will be unable to view the paid program being transmitted. This is accomplished by selecting the payment indicator lamps 34 so that they have a resistance such that they restrict the current flow in the circuit in which they are in series to a value sufficiently low so that the frequency converter tube, with its filament in series with a lamp 34, is inoperative. As an example, 7 watt, 115 volt lamps have been found satisfactory as payment indicator lamps 34 to operate in conjunction with a 6.3 volt, 150 milliamp tube filament and a 15 watt, 115 volt free program indicator lamp 30.

Using these values for the lamps and electron tube filament it was found that when a 7 watt, 115 volt payment indicator lamp 34 was placed in series with the filament of the frequency converter tube, the free program indicator lamp 30, and the electromagnet 38, the tube filament received about half its rated current and was hence not heated sufficiently to render the tube operative. In addition, the current through the free program indicator lamp 30 was reduced to the point where the lamp 30 was virtually inoperative. The electric circuit shown therefore provides a simple and effective method of causing the paid indicator light 34 to be lit and simultaneously rendering the frequency converter 55 inoperative and extinguishing the free program lamp 30.

It should be noted that it is necessary that the electromagnet 38 be operative to retain the coin gate 36 in its closed position both when a payment indicator lamp 34 is in series in the circuit and when such lamp is short circuited. In other words, the electromagnet 38 must be capable of retaining the coin gate in its closed position for values of current having a ratio of approximately 2 to 1 or more. This is easily attained in practice.

From the above explanation, it will be seen that when the stepping switch 52 is rotated to the contact 73*a* and before the subscriber has deposited any coins in the control box, the subscriber's television reception will be cut off, the paid program lamp 30 will be extinguished and the payment indicating lamp 34*a* will be lit indicating that a payment of $1.50 is required to view the program in progress.

If the subscriber has deposited six coins prior to the movement of the stepping switch to the contact 73*a*, the coin in the coin position in front of the lamp 34*a* will cause the lamp 34*a* to be short circuited. However, this has no effect until selector switch 52 moves its contact 72 to engage fixed contact 73*a*, which is accomplished by a single pulse from the central station at the end of the free broadcast period. This removes the resistance of the lamp 34*a* from the series circuit including the frequency converter tube filament. The current passing through the tube filament will thereby be increased to a value sufficient to render the tube and hence the converter operative. The subscriber will then be able to view the paid program in progress. In addition the indicator lamp 30 will light indicating that the proper payment for the program has been made. Of course, deposit of the same six coins after switch 52 moves to contact 73*a* will have the same effect.

It should be observed thatt he deposit of less than the required number of coins, for example, five coins, will not cause a coin to be placed in position in front of the indicator lamp 34*a* to short circuit this lamp. Therefore the deposit of less than the required number of coins will not complete the converter tube filament circuit so as to enable the subscriber to view the paid program.

In the event that the control station wishes to charge less than the maximum for a paid program, the control station sends out additional control pulses at the start of the paid program. For example, if it is desired to charge $1., the central station sends out three control pulses rather than one control pulse as explained in the situation above. In this event the rotating contact 72 will be moved from the contact 73, past the contact 73*a* and the contact 73*b* to the contact 73*c*. It should be noted that the operation of the stepping switch 52 will be rapid enough so that no substantial interruption is produced in the current supply to the electromagnet 38. Thus if the subscriber has already deposited the required coins, the movement of the stepping switch between contacts will be sufficiently rapid so that the gate 36 is not opened and the coins are not prematurely collected.

With the rotating contact 72 of the stepping switch 52 oriented to the fixed contact 73*c*, the operation of the control box is similar to that described previously except that only four quarters are required to render the frequency converter operative and allow the subscriber to view the paid program. By sending from one to six control pulses the central station may therefore require a fee of from one to six quarters for viewing a given paid program.

At the conclusion of a paid program the coins in the control box are collected by dropping them into the coin receptacle. This operation is likewise controlled by a signal from the central control station. Taking as an example a situation where the subscriber has deposited six quarters for a $1.50 program and hence the rotating contact 72 is turned to the fixed contact 73*a*, at the conclusion of the program the central control station would transmit six control pulses thereby rotating the contact 72 through six positions to the contact 73*g*. It has previously been explained that the contact 73*g* is the "off" contact of the stepping switch 52. Contact 73*g* therefore represents a position where the series circuit of the electromagnet 38, the indicator lamp 30, and the converter tube filament is open.

When the rotating contact 72 is turned to contact 73*g* the frequency converter is disabled thus cutting off the subscriber's television reception. The indicator lamp 30 is extinguished and the electromagnet 38 is de-energized. If there are any coins in the coin chute, the weight of these coins will cause the gate 36 to open releasing the coins into the coin receptacle 16. Thus by sending a sufficient number of control pulses to rotate the contact 72 to the off position 73*g*, the central station may cause the coins in the control boxes to be collected by falling into the coin receptacle 16.

The control box is provided with a recording apparatus to provide a record of the number of programs viewed by each subscriber and also a record of which programs were viewed. By having this information the coin collections may be checked against the program records to assure that revenue loss is not being produced as a result of faulty equipment or by tampering with the control boxes or for any other reason. Also, the popularity of individual programs may be determined.

A roll 42 of paper tape 41 is provided in the control box for recording the programs viewed by the subscriber. Tape 41 would normally be provided with index marks although this is not essential. The paper tape 41 may also be provided with sprocket holes or alternatively the device may be arranged so that the sprocket holes are punched by the control box itself. Tape 41 runs from the roll 42 over a drive wheel 44. The drive wheel 44 may be in the nature of a sprocket having lugs or teeth 43 for engaging the tape 41. Of course other suitable means may be employed so that the drive wheel 44 positively engages the paper tape 41.

An idler wheel 44*a* is provided to hold the paper 41 in engagement with the drive wheel 44. A serrated cutting member 44*b* is provided near the drive wheel 44 so that a portion of the paper tape 41 bearing the program record may be readily torn off and placed with the coins collected from its particular control box. Of course, the cutting member 44*b* may be omitted and the person collecting the coins may be provided with a small knife or other suitable tool for removing the used portion of paper tape 41 from the control box.

An electrical marking contact 44*c* is provided where the paper tape 41 passes over the drive wheel 44. The drive wheel 44 is electrically connected to ground 63. When a sufficiently high voltage, for example, 100 volts or so, is applied to the marking contact 44*c*, an arc is created between the contact 44*c* and the drive wheel 44 which burns a small hole in the paper tape at that particular location. The marking voltage is supplied to the marking contact 44*c* by the coin gate contact 36*a*. The contact 36*a* is open when the coin gate 36 is closed and the contact 36*a* is closed when the coin gate 36 is caused to be open by the weight of one or more coins in the coin chute 21.

The contact 36*a* is electrically connected to the rotating contact 72 of the stepping switch 52. A high voltage is available at the rotating contact 72 of the stepping switch 52 when the stepping switch is at the off position 73*g*. This high voltage is available due to the fact that there is no current flow through the electromagnet 38, indicator lamp 30, and the frequency converter tube filament. There is therefore no voltage drop across these elements and substantially the entire voltage from the rectifier 63 is available at the rotating contact 74.

It should be noted, however, that a high voltage is not applied to the coin gate contact 36*a* when the rotating contact 72 is turned to the ground contact 73. It is thus impossible for a mark to be inadvertently produced on the tape when the control box is set to provide free television distribution.

The drive wheel 44 transports the paper tape 41 past the marking contact 44*c*. The drive wheel 44 is driven by the motor 46 in synchronism with the rotating contact 72 of the stepping switch 52. The tape 41 is thus moved one position as the rotating contact 72 is rotated one position. No mark is made on the paper tape 41 except at such times as the gate 36 is caused to be open to drop coins into the coin receptacle 16. This will occur only once for each complete cycle of the stepping switch 52 when the rotating contact 72 returns to the off contact 73*g*.

It will be noted that the tape is marked only if the subscriber deposits coins in the control box. Otherwise the gate 36 will remain closed when the electromagnet 38 is deactivated since the gate is balanced to remain closed in the absence of coins to over balance the armature 38*a*.

The recording mechanism therefore provides a record of the programs viewed by the subscriber. The central office is thus able to determine the number of coins which should have been collected in the subscriber's coin receptacle. For example, the central office may see that in a given month a subscriber had viewed programs 7, 14 and 32. From this the central office will be able to determine that the total fee for those programs was $2.00 or eight quarters. It is therefore possible for the system operator to make sure that the proper revenue is collected and turned in at the central office.

If the coins in the control box were inadvertently collected in the middle of a program due to some malfunctioning for instance, the paper tape would be marked at an intermediate point. It would thus be possible for the central station personnel to verify a subscriber's claim for a refund in such a case.

The recording feature of the present invention accurately indicates the programs viewed by a particular subscriber. If desired, the system may therefore be operated on a deferred or charge account basis. In such a case the subscriber's control box would not need a coin receptacle, but would rather be provided with a switch to be operated by the subscriber, and functioning in the same manners as contact 36*a*. The recorder for the control box would operate as before and the subscriber would be billed periodically for programs viewed.

The distribution system for supplying the control signal to the subscriber's control box is also shown in FIG. 5. Electrical wiring carrying a voltage of more than approximately 20 volts may not be introduced into the subscriber's house without conforming to rather rigorous safety requirements. Provision is therefore included in the present system to limit the voltage of the control signal introduced into the subscriber's house to less than 20 volts.

The electromagnet 74 operates the armature 75 to convert the electrical control signal to a mechanical signal to operate the escapement of the motor 46 and thus produce a unit displacement of the stepping switch 52 and the tape drive wheel 44. The electromagnet 74 is connected in series with a voltage dropping resistor 77. The voltage dropping resistor 77 is placed outside the subscriber's house, for example, on the pole carrying the distribution line. The resistor 77 is adjusted by the installer to limit the voltage distributed to the subscriber's house to less than 20 volts and thus comply with safety regulations.

It will be observed that the control signal required to operate the subscriber's control boxes could be distributed as a direct current signal on the coaxial cable which is used to distribute the television signal. In the system shown in FIG. 5, however, a separate distribution line DL is shown for the control signal. The circuit shown in FIG. 5 is adapted to use a direct current control signal and it is therefore possible to also use the control signal distribution line to distribute high quality audio entertainment such as music and the like.

Apparatus for separating the audio signal and the direct current control signal is shown in FIG. 5. A transformer 78 is shown connected to one side of the distribution line DL from a central control station 70*a*. The circuit of the transformer primary is completed by a D.C. blocking condenser 76 connected to the other side of the distribution line. The transformer 78 is provided with a movable tap 79 on the secondary of the transformer so that the voltage of the audio signal supplied to the subscriber's house may be controlled.

A loud speaker 81 and a variable resistor 82 may then be connected in series with the secondary of the transformer 78 to provide a high quality sound distribution signal in the subscriber's home. The loud speaker 81 and the volume control resistor 82 would of course be placed at a suitable location inside the subscriber's home. The transformer 78 would normally be placed on the pole carrying the distribution line and would be adjusted only by system personnel.

The D.C. control signal passes through the transformer 78 to the electromagnet 74 and is not substantially impeded by the transformer 78 or the D.C. blocking capacitor 76.

Although the foregoing distribution and control system has been explained with reference to a television distribution system in which only one television channel was distributed to a subscriber, it is obvious that in addition to paid programs other free television channels could be simultaneously distributed to the subscriber. These other channels could be distributed over separate cables or could be distributed over the same cable.

Whereas the paid channel would be distributed at a frequency other than the normal television receiver frequency so that it would be usable only after conversion by the frequency converter, programs which it was desired to distribute as free channels would be distributed at the ordinary television channel frequencies so that they could be utilized by the subscriber even though the frequency converter 55 was inoperative. For this purpose the receiver could also be coupled to converter terminal $F_1$.

In some cases it may be desirable to utilize an alternating current control signal rather than a direct current control signal. This would have certain advantages such as allowing the use of transformers in the distribution system and a further advantage of making it more difficult for a subscriber to introduce a fraudulent control signal. In addition, if the alternating current control signal is used, the distribution line may be utilized for the transmission of a still further direct current signal for any desired purpose. This direct current signal might be utilized, for example, with appropriate apparatus to provide an instantaneous central station indication of the number of subscribers viewing a program.

Figure 6:
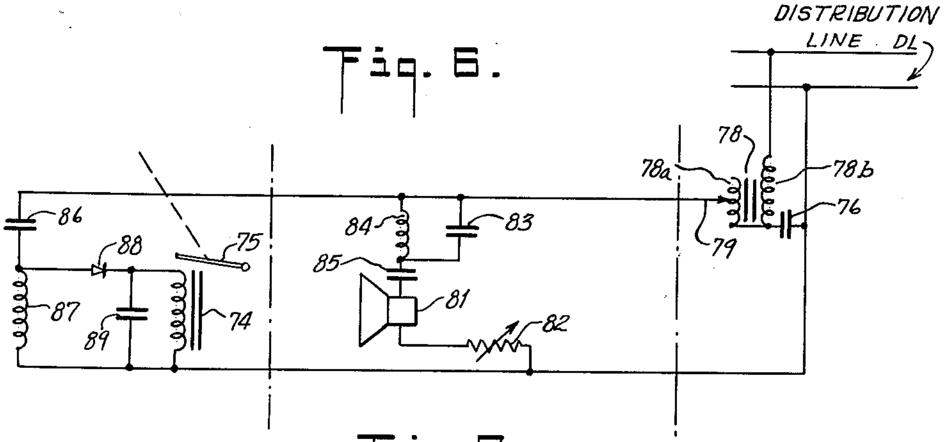
FIG. 6 is a schematic circuit diagram of an alternative distribution and control circuit designed to employ an alternating current control signal.

An alternative distribution system adapted for use with an alternating current control signal is shown in FIG. 6. Transformer 78 in series with the D.C. blocking capacitor 76 is connected across the distribution line DL in the same manner as was shown in FIG. 5. In FIG. 6, however, the secondary *78a* of the transformer 78 is coupled at one end to the primary *78b* of the transformer 78. The alternating current circuit to the subscriber's house is thus completed through the blocking condenser 76 and through the transformer secondary *78a*. A direct current path from the subscriber's house to the central distribution station is thus provided by a direct connection to one side of the distribution line and the connection through the secondary *78a* and the primary *78b* of the transformer 78 to the other side of the distribution line.

Only two wires are led to the subscriber's house. The loud speaker 81 and the volume control variable resistor 82 are connected in series with a D.C. blocking condenser 85 and to a low-pass filter comprising an inductance 84 and a capacitance 83. This series combination is connected across the leads to the subscriber's house. The inductance 83 and capacitance 84 in parallel are tuned to reject the frequency of the alternating control signal. The frequency of the alternating control signal may be selected to be a high value such as 15,000 cycles to further minimize any possible interference between the distribution control signal and the high quality audio program if desired. The capacitor 85 is provided so that any direct current signal on the distribution line is not short circuited by the loud speaker circuit.

The control section of the distribution circuit of FIG. 6 is connected in parallel with the loud speaker circuit just explained. A capacitor 86 and an inductance 87 are connected in series across the subscriber's distribution leads. The capacitance 86 and the inductance 87 are selected to provide a band-pass filter tuned to the frequency of the alternating current control signal. The control electromagnet 74 is connected in series with a rectifier 88 across the inductance 87. The electromagnet 74 is thus provided with a direct current signal for actuating the armature 75 which is mechanically coupled to the motor 46 as before. A capacitor 89 is connected across the terminals of the electromagnet 74 to filter out the A.C. component of the output of the rectifier 88.

It is not intended that the distribution system of FIG. 6 be limited to the particular type of circuit shown but rather it is to be understood that many equivalent arrangements could be substituted for various parts of the circuit of FIG. 6. For example, other more complex band-pass or blocking filter circuits could be substituted, the rectifier 88 could be eliminated so that the electromagnet 74 is operated by an alternating current signal and the blocking capacitor 85 could be eliminated in the event that it was not desired to utilize the distribution line for a direct current signal.

The control box circuit shown in FIG. 5 has certain features which may be disadvantageous in certain cases. Thus the "on" indicator light 30 remains lit when a paid program is being viewed. The advantage of having this indicator light on may be outweighed by the disadvantage of having a light on at the control box during the course of a paid program. It is quite possible that with the control box at or near the television set such a light would distract the viewers or detract from the quality of the television program. The alternative control box circuit of FIG. 7 therefore eliminates this feature of the control box.

Figure 7:
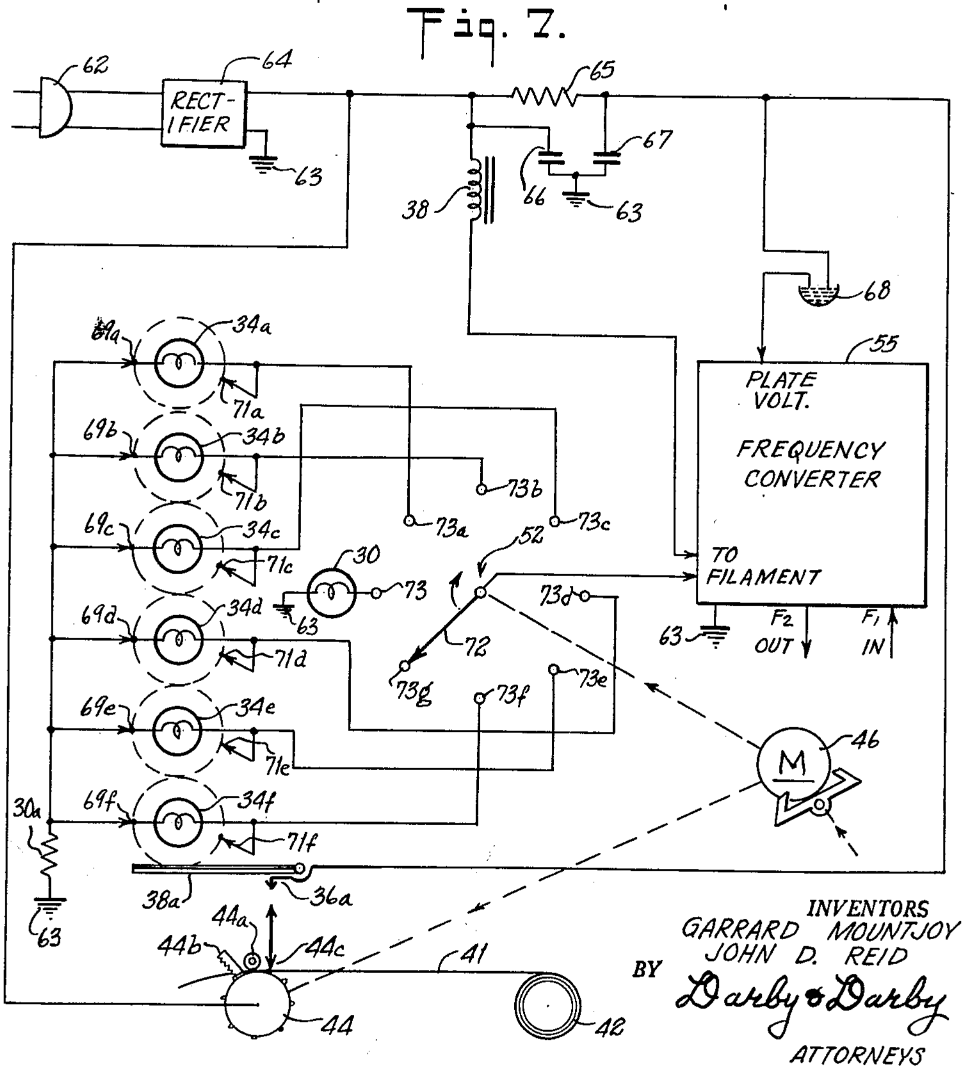
FIG. 7 is a schematic circuit diagram of an alternative indicator and collection circuit for the control box.

In addition the circuit of FIG. 7 is arranged so that the record tape in the control box is not marked in the event that the subscriber places fewer than the required number of coins in the control box. This is an improvement over the circuit of FIG. 5 which produces a mark on the record tape even though the subscriber may have put in insufficient coins and thus was not actually able to view the program. This situation would probably be rare but might arise in the event that the subscriber changed his mind or found that he did not have sufficient coins to view the program.

The change in the operation of the on indicator light 30 is accomplished by connecting the indicator light 30 between the free program contact 73 and ground 63. Thus when the rotating contact 72 is positioned at the free program contact 73 the operation of the control box is the same as before. This is obviously true since the indicator lamp 30 is still in series with the frequency converter tube filament as before.

However, in the circuit of FIG. 7 when the rotating contact 72 is positioned at any of the pay program contacts *73c*, *73b*, etc., the indicator lamp 30 is no longer in the completed electrical circuit and hence will be extinguished. The frequency converter tube filament will still not be heated sufficiently to operate since each of the payment indicator lamps 34 is of sufficiently high resistance by itself to restrict the filament current to a value below the operating point. A resistor *30a* is connected between the contacts 69 and ground 63. The resistance value of resistor *30a* is approximately equal to the resistance of indicator lamp 30 so that the proper current is supplied to the converter tube filament when the control box is supplied with the necessary number of coins to view a pay program.

The change in the location of the "on" indicator lamp 30 in the circuit therefore causes the lamp 30 to be extinguished during the viewing of pay programs without otherwise interfering with the operation of the control box.

The other change in the control box circuit of FIG. 7 involves the electrical connection to the marking contact *44c*. The marking contact *44c* is still connected through the coin gate contact *36a* so that no mark is made unless the coin gate 36 is opened. However, the coin gate contact *36a* is now electrically connected to a terminal of the filter resistor 65 rather than to the stepping switch 52 as before.

It is obvious that when the frequency converter is inoperative it will draw little or no plate current through the spill switch 68. The marking circuit will draw no current so that there is little or no current flow through the resistor 65. The drive wheel 44 in FIG. 7 is not connected to ground but is rather connected to the other terminal of the filter resistor 65. The two filter condensers 66 and 67 are effectively connected in parallel with the resistor 65. When a current flows through the resistor 65 creating a voltage drop across the resistor, the capacitors 66 and 67 will be charged to a voltage equal to the voltage drop across the resistor 65. On the other hand when no current flows through the resistor 65 the capacitors 66 and 67 will discharge through the resistor 65 so that after discharge no voltage exists between the terminals of the resistor 65.

From the foregoing explanation it will be observed that if a subscriber has deposited sufficient coins to view a program and has hence caused the frequency converter to be activated so that a plate current flows through the resistor 65, then the capacitors 66 and 67 will be charged when the rotating contact 72 is rotated to the off contact 73*g*. When the coins close the coin gate contact 36*a* the capacitors 66 and 67 will discharge through the marking contact 44*c* causing an arc which will burn a hole to mark the recording tape 41.

In the event that the subscriber deposits coins which are not sufficient in number to energize the frequency converter then no plate current will be drawn through the resistor 65. The capacitors 66 and 67 will not be charged and hence no mark will be made on the recording tape 41 when the coins cause the coin gate 36 to open.

Thus by the modifications in the marking circuit of FIG. 7 an arrangement is provided where no mark is made on the record tape if the subscriber has no deposited a sufficient number of coins to view a given program.

It should be understood that while the recording apparatus shown and described herein is thought to have many desirable features, other marking apparatus could be used. For example, a rotating card record could be used in place of the tape shown and described. Also the record could be marked with ink or by punching rather than by the electrical marking means shown.

Figure 8:
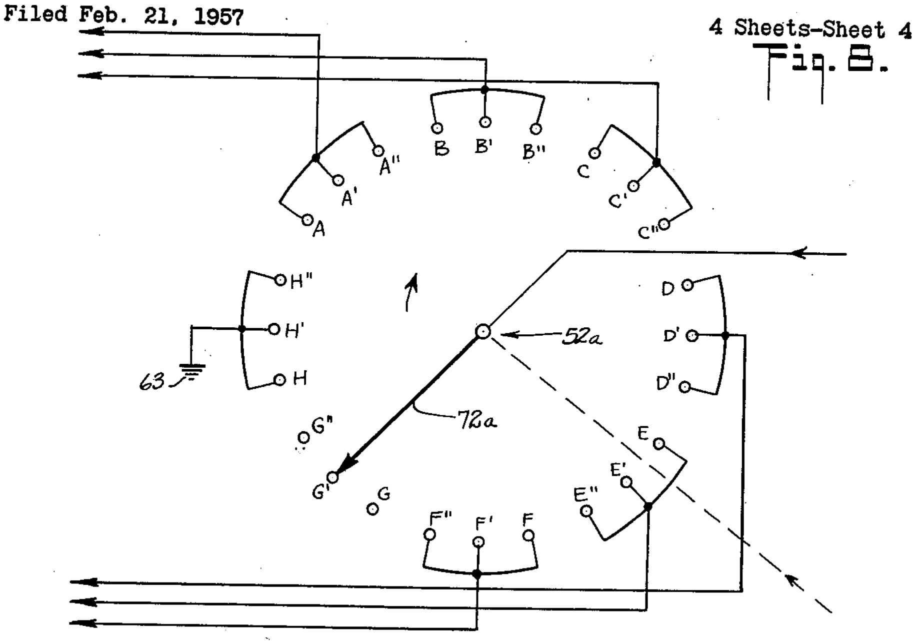
FIG. 8 is a schematic diagram of an alternative stepping switch having multiple contacts at each position.

An improvement over the stepping switch 52 of FIGS. 5 and 7 is shown in FIG. 8. This alternative stepping switch is provided with 24 contacts so that where a single contact was provided at each position of the stepping switch of FIGS. 5 and 7, three contacts are provided in the stepping switch of FIG. 8. The switch 52*a* is provided with a rotatable contact arm 72*a* in the customary manner. The rotatable contact arm 72*a* may be driven by a spring-wound escapement controlled motor 46 as shown in FIGS. 5 and 7, for example.

At a position corresponding to the off contact 73*g* in FIG. 7 there are three off contacts G, G′ and G″ in FIG. 8. The free program contact 73 in FIG. 7 is replaced by three free program contacts H, H′ and H″. The contacts H, H′ and H″ are electrically connected to ground 63 corresponding to the connection of the contact 73 in FIG. 5.

Six further sets of three contacts each are shown in FIG. 8, namely, A, A′ and A″; B, B′, and B″; C, C′ and C″; D, D′, and D″; E, E′, and E″; and F, F′ and F″. These sets of three contacts correspond to the contacts *73a*, *73b*, *73c*, *73d*, *73e* and *73f* in FIGS. 5 and 7. The three contacts of each set are electrically connected together and each set is electrically connected to a respective one of the payment indicator lights 34 as in FIG. 5 or 7.

The stepping switch 52*a* is arranged so that a control pulse from the central station moves the rotatable contact arm 72*a* clockwise from one contact to the adjacent contact. Twenty four such pulses are therefore necessary to complete a full cycle of the rotatable contact arm 72*a*. In the operation of a system incorporating a stepping switch 52*a* as shown in FIG. 8, three times as many pulses will be transmitted to accomplish a given function as in the case of the stepping switch 52 shown in FIGS. 5 and 7.

The operation of the stepping switch 52*a* is normally started from the position shown in FIG. 8, namely, with the rotatable arm 72 positioned at the central contact G′ of the three "off" contacts. If it is desired to transmit a free program, three pulses will be sent to each of the subscribers' control boxes. These three pulses will move the rotatable contact arm 72*a* from G′ to G″ to H to H′. The advantage of the multiple contact type switch 52*a* resides in the fact that an error of one pulse in either direction may be tolerated without causing a malfunction of the system.

If it is desired that the function of the system be further refined, a stepping switch of the home-seeking type may be used. In such a switch, the last several contacts are arranged so that the switch pulses itself to a predetermined "Home" position and hence the switch is automatically synchronized after each revolution.

The control box for the distribution system has been shown in FIGS. 5 and 7 to operate directly from a 110 volt household current supply. It is obvious that if it is desired to remove the possibility of shock or injury from the 110 volt power supply, a step-down transformer may be inserted between the power plug 62 and the remainder of the control box. The voltage ratings of the various components may readily be adjusted for lower voltages and thus the presence of dangerous voltages in the control box may be eliminated.

In FIG. 9 a novel motor driven switch is shown which may be used to replace the stepping switch 52 driven by the escapement control spring wound motor 46. Although the spring wound motor arrangement 46 is quite satisfactory, it is obviously desirable to eliminate the necessity for periodically winding a spring wound motor in the control box. The necessity for winding the motor is eliminated by use of the novel motor driven switch in FIG. 9, and at the same time substantially all of the desirable features of the spring-wound motor-driven stepping switch are retained.

Stepping switches are, of course, known where the switch is driven directly by a solenoid or electromagnet. These devices have a distinct disadvantage, however, in that they require a substantial amount of power.

The power required by solenoid or electromagnet driven stepping switches is only required for a very short interval of time. The novel switch of FIG. 9 circumvents this high power requirement by providing a switch which utilizes a far smaller amount of power and requires a somewhat longer time of operation. Although the total energy required to operate the switch may be approximately the same in both cases, it is obvious that the maximum power required at any instant may be far less for the slower motor driven switch of FIG. 9. Though the time of operation for the switch of FIG. 9 is relatively much greater than for an electromagnet operated switch, the time interval of operation for the motor of FIG. 9 may still be kept to a value which is not prohibitively large. For example, it may readily be designed to operate on pulses of less than one second duration.

Referring now to FIG. 9, there is shown at 91 a motor driven switch having a frame 92 on which there is supported a motor 93. The frame 92 is preferably constructed of non-conductive material so that a number of contacts 94 mounted on the frame are mutually insulated. Of course, the frame 92 may be made of conductive material and the contacts 94 may be provided with other means to mutually insulate them.

A ratchet wheel 95 is pivotally mounted on an axle 96 and a rotating contact arm 97 is connected to the ratchet 95 for rotation therewith. As the ratchet 95 and the contact arm 97 rotate, the contact arm 97 slides from one to another of the fixed contacts 94 establishing electrical connection with one after another of the contacts 94. The contact arm 97 is electrically connected to a commutator ring 98 mounted on the ratchet 95. A commutator contact member or brush 99 is mounted on the frame 92 and extends inwardly from a point outside the periphery of the fixed contacts 94 to contact the commutator ring 98.

Each of the contacts 94 is provided with an electrical connection by means of a respective wire lead 101. Electrical connection is established to the commutator contact 99 by wire lead 102. Thus when the ratchet 95 and the rotating contact 97 are rotated about the shaft 96, an electrical connection is established from the lead 102 to first one and then another of the respective leads 101. Substitution of the switch 91 for the switch 52 in FIG. 5, for example, would require only the connection of the wires 101 to appropriate ones of the payment indicator lamps 34 and the connection of the wire 102 to the frequency converter filament. Similarly, switch 91 may have triple contacts as in FIG. 8.

The ratchet 95 is rotated by a hook or pawl member 103. The pawl 103 is provided with an angular extension 104 and a hooked end 105. The pawl 103 is constructed of resilient material such as piano wire, for example. The pawl may therefore be bent downward to the position 103' shown in dotted lines so that the hook 105 engages a notch 106 of the ratchet 95 and turns the ratchet 95 through one-eighth of a revolution. The pawl 103 is connected to the motor 93 by means of a flexible strand or connecting cord 107. The strand 107 is wound around the motor shaft 108.

The motor 93 has electrical connections 109 which will be connected in the same manner as the electrical connections to the electromagnet 74 in FIG. 5 where it is desired to substitute the stepping switch of FIG. 9 for that of FIG. 5. The motor 93 may be a D.C. motor so that it may be directly substituted in the circuit of FIG. 5. However, the invention is not limited to the use of a D.C. motor and an A.C. motor, and in fact, any kind of rotating electrical motor may be used in accordance with the invention.

From the foregoing description and explanation it will be seen that an appropriate pulse supplied to the motor 93 through the electrical leads 109 will cause the motor 93 to be energized and the shaft 108 to rotate. The rotation of the shaft 108 will cause the strand 107 to be wound on the shaft thereby drawing the pawl member 103 to the position 103' in FIG. 9 where it will be stopped by the stop peg 111 attached to the motor 93. The device may be designed so that a pulse of a duration of somewhat less than one second will be sufficient to complete the operation described above. After the pawl 103 has reached the stop peg 111, the motor 93 will thereafter be stalled for the remainder of the duration of the pulse.

At the termination of the pulse the motor 93 will be de-energized and the restoring force of the resilient pawl 103 will cause the strand 107 to unwind from the shaft 108. This restoring action will be relatively rapid since very little resistance will be encountered in the rotation of the shaft 108 with motor 93 de-energized.

It will be further noted that the starting load on the motor 93 due to the spring action of the pawl 103 is relatively small compared to the load on the motor as the pawl 103 approaches its final position 103'. The fact that the starting load for the motor is thus reduced further reduces the maximum current demand of the switch 91. Switch 91 can thus be readily designed to require a maximum current which is only a tenth of that required by a comparable magnet or solenoid operated switch.

Although the invention is not limited to switches of any particular size, it should be noted that low-power electric motors are available having a maximum dimension of one inch or less so that the motor operated switch of FIG. 9 may be constructed to be substantially as compact as a comparable electromagnet or solenoid operated switch. It will further be observed that the exact operating characteristics of the motor 93 are not critical in any respect whatsoever. The torque of the motor, the speed of the motor and other characteristics are virtually irrelevant since the motor is not synchronized in any manner whatsoever but simply is driven until it reaches the stall point. In some instances it might be desirable to utilize a motor which could be stalled for substantial periods without damage. However, in most cases even this would not be necessary since the motor would seldom be stalled for long periods in the usual application.

By using the motor driven switch as described in FIG. 9 it is thereby possible to avoid the necessity for a spring wound motor in the control box and at the same time utilize a motor which is not driven from the subscriber's household power supply but is rather driven by a current sent over the control distribution line. The current demand of such a motor driven switch is so small that the control boxes of a hundred or more subscribers may be easily be controlled simultaneously without requiring a prohibitively large control signal current. The application of the motor driven switch of FIG. 9 is obviously not limited to the particular television distribution system of the present invention, but is also applicable for uses on other devices. It is obvious that the motor driven switch is not limited to a particular type of eight-contact stepping switch as shown in FIG. 9. The same principle may also be applied to stepped switches having a greater or lesser number of contacts and also to single or multiple on-off switches. In the latter case the motor 93 would be connected by means of the strand 107 to open or close one or more contacts of the leaf type, for example. The contacts would be retained in their operated position for as long as the motor 93 was energized. When the motor 93g is de-energized, the contacts would return to their unoperated position.

By using the motor operated type switch, it is not only possible to reduce the power requirement, but the motor also serves in effect as an integrator so that short pulses or pulses having less than a given time integral do not operate the switch. While the motor driven switch of FIG. 9 is very desirable for the present application, it should be noted that it has many other desirable features which may well be used in other applications.

From the foregoing description it will be obvious that the present invention provides a television distribution control system particularly adapted for use with closed circuit television distribution and which includes provisions for pre-payment for individual television programs, recording the programs viewed, distribution of free programs for advertising and other purposes, and other desirable features.

Many modifications may be made to the television distribution system and components thereof described without exceeding the scope of the present invention. The scope of the present invention is therefore not to be considered limited to the particular embodiments described, but is rather to be limited solely by the appended claims.

What is claimed is:

1. A control apparatus for an individual program payment television distribution system of the type wherein the distributed television signals are not usable in a standard television receiver, said control apparatus comprising a converter operable when energized to convert the distributed television signals into corresponding television signals usable by a standard television receiver, a coin chute, a plurality of sets of electrical contacts each set being adapted to be closed in response to the presence of coins at a respective spaced position in said coin chute, a coin gate at the end of said coin chute, means operable when energized to retain said coin gate in closed position against the weight of said coins, a stepping switch adapted to be controlled in response to a remote control signal, means for connecting respective terminals of said stepping switch with corresponding ones of said electrical contacts, further means connecting said stepping switch and said contacts to complete an electric circuit to energize said converter and said coin gate retaining means, whereby said control apparatus may be operated by said remote control signal to require the deposit of a certain number of coins in order to render said converter operative so that the distributed signal will be converted to allow viewing of a given program and said coin gate may be released at the termination of said program to collect said coins.

2. A control apparatus as claimed in claim 1 further including a tilt switch in series with the electrical circuit of said converter whereby tampering with said control apparatus will render said frequency converter inoperative.

3. A control apparatus as claimed in claim 1 further including means for causing coins smaller than a predetermined size to be ejected from said coin chute.

4. A control apparatus as claimed in claim 1 wherein said stepping switch has each set of a plurality of adjacent contacts electrically connected together so that a movement of a like plurality of steps of said switch is required to change the electrical connection from one connection to the succeeding connection.

5. A control apparatus as claimed in claim 1 further including a plurality of lamps, each lamp being connected in parallel with a respective set of said electrical contacts, and the resistances of said lamps being such that the current passed by a lamp is insufficient to energize said converter, whereby one of said lamps will be lit to indicate the position of said stepping switch and hence to indicate the number of coins which must be deposited to close the contact associated with said lamp and render the converter of the control apparatus operative.

6. A control apparatus as claimed in claim 1 further including means for directly connecting at least one contact of said stepping switch to provide a circuit to energize said converter when said stepping switch is oriented to said last-named one contact, whereby said control apparatus may be operated by a remotely controlled signal to render said converter operative without the necessity for deposit of coins in the control apparatus.

7. A control apparatus as claimed in claim 6 further including a lamp connected to said directly connected contact of said stepping switch to light when said contact is operative, whereby said lamp will be lit to indicate that the stepping switch is positioned to operate said converter without the necessity for the deposit of coins in said control apparatus.

8. A control apparatus as claimed in claim 1 further including means for recording the opening of said coin gate on a movable record and means for moving said record in coordination with the movement of said stepping switch.

9. A control apparatus as claimed in claim 8 wherein said means for recording the opening of said coin gate comprises means for creating an electrical arc through said movable record in response to the opening of said coin gate.

10. A control apparatus as claimed in claim 9 wherein the voltage source for said electrical arc is derived from a capacitor connected to be charged in response to a current flowing in the plate circuit of said frequency converter whereby a mark is made on said movable record only after said frequency converter has operated causing said capacitor to be charged.

11. A control apparatus for an individual program payment television distribution system comprising a video frequency converter for converting a signal of a frequency unusable in a standard television receiver to a corresponding signal of a frequency usable in a standard television receiver, a coin chute, a plurality of sets of electrical contacts located at spaced positions in said coin chute, each set being adapted to be closed in response to the presence of a coin at a respective one of said spaced positions in said coin chute, a coin gate at the end of said coin chute, means including an electrogmagnet for retaining said coin gate in closed position against the weight of said coins, a stepping switch adapted to be controlled in response to a control signal comprising a plurality of fixed contacts, a rotating contact arranged to make contact selectively with respective ones of said fixed contacts, a motor connected to rotate said rotatable contact, an electromagnet-controlled escapement mechanism for releasing said motor for stepwise rotation in response to an electrical control signal, means for connecting respective fixed contacts of said stepping switch with corresponding ones of said electrical contacts, and further means connecting said stepping switch and said contacts in series with a circuit of said converter and said coin gate-retaining means, whereby said control apparatus may be operated by a remotely controlled signal to require the deposit of a certain number of coins in order to render said frequency converter operative and whereby said coin gate may be released at the termination of said program to collect said coins.

12. A control apparatus for an individual program payment television distribution system comprising a video frequency converter for converting a signal of a frequency unusable in a standard television receiver to a corresponding signal of a frequency usable in a standard television receiver, a coin chute, a plurality of electrical contacts located at spaced positions in said coin chute and adapted to be closed in response to the presence of coins at respective ones of said spaced positions in said coin chute, a coin gate at the end of said coin chute, an electromagnet for retaining said coin gate in closed position against the weight of said coins, a stepping switch adapted to be controlled in response to a control signal comprising a plurality of fixed contacts, a rotating contact arranged to make contact with respective ones of said fixed contacts in sequence, a ratchet wheel rotatably mounted and connected to rotate said rotatable contact, an electric motor having a rotatable shaft, a movable arm mounted to engage a tooth of said wheel to rotate said wheel, resilient means for urging said arm to an initial position, and a string having one end connected to said movable arm and the other end attached to said shaft, means for connecting respective fixed contacts of said stepping switch with corresponding ones of said electrical contacts, further means connecting said stepping switch and said contacts in a series circuit in series with a circuit of said converter and said coin gate retaining means, whereby said control apparatus may be operated by a remotely controlled signal to require the deposit of a certain number of coins in order to render said frequency converter operative and said coin gate may be released at the termination of said program to collect said coins.

13. In an individual program payment television distribution system, a control apparatus which is adapted to be connected to a household power supply comprising a rectifier, means for connecting said rectifier to a household power supply, a filter circuit connected to a first output terminal of said rectifier, a frequency converter for converting a video signal of a frequency which is unusable in a standard television receiver to a corresponding video signal of a frequency which is usable in a standard television receiver, a mercury spill-switch, means for making an electrical connection from the output of said filter through said mercury spill-switch to supply a plate voltage to an electron tube of said frequency converter, a coin chute, a plurality of sets of electrical contacts, each set being adapted to be closed in response to the presence of a coin at a respective one of spaced positions in said coin chute, a coin gate at the end of said coin chute, means for retaining said gate in a normally closed position in the absence of coins in said coin chute, an electromagnet for retaining said coin gate in the closed position in the presence of coins in said coin chute, a low resistance indicator lamp, a stepping switch adapted to be controlled in response to control signals comprising a plurality of fixed contacts, a rotating contact arranged to make contact selectively with respective ones of said fixed contacts, a clock-work motor connected to rotate said rotatable contact, an electromagnet controlled escapement mechanism for releasing said clock-work motor for stepwise rotation in response to an electrical control signal, means for connecting said electromagnet, said low resistance lamp, and a filament of a tube of said frequency converter in a series circuit, and further means for connecting said series circuit between said first output terminal of said rectifier and the rotatable contact of said stepping switch, means for connecting a first of said fixed contacts of said stepping switch to a second output terminal of said rectifier, means for connecting further ones of said fixed contacts of said stepping switch through corresponding ones of said coin-responsive contacts to the second output terminal of said rectifier, and a plurality of relatively high resistance lamps, each said lamp being connected in parallel with a respective one of said coin-responsive contacts.

14. A control apparatus as claimed in claim 13 further including a paper record tape, a rotatable member engaging said tape for moving said tape, means for rotating said rotatable member in synchronism with said stepping switch, electrical contacts adjacent said tape for creating an electrical arc to mark said paper tape, a switch closable by the opening of said coin gate, and means for connecting said switch and said arc creating contacts in a series circuit with the output terminals of said rectifier.

15. A control apparatus as claimed in claim 13 further including a low resistance lamp connected in series between said first contact of said stepping switch and said second terminal of said rectifier.

16. In an individual program payment television distribution system, a control box which is adapted to be connected to a household power supply comprising a rectifier, means for connecting said rectifier to a household power supply, a filter circuit comprising a series connected filter resistor and at least one parallel connected capacitor connected to a first output terminal of said rectifier, a frequency converter for converting a video signal of a frequency which is unusable in a standard television receiver to a corresponding video signal of a frequency which is usable in a standard television receiver, a mercury spill-switch, means for making an electrical connection from the output of said filter through said mercury spill-switch to supply a plate voltage to an electron tube of said frequency converter, a coin chute, a plurality of electrical contacts adapted to be closed in response to the presence of coins at respective spaced positions in said coin chute, a coin gate at the end of said coin chute, means for retaining said gate in a normally closed position in the absence of coins in said coin chute, an electromagnet for retaining said coin gate in the closed position in the presence of coins in said coin chute, a low resistance indicator lamp, a stepping switch adapted to be controlled in response to control signals comprising a plurality of fixed contacts, a rotating contact arranged to make contact selectively with respective ones of said fixed contacts, a clock-work motor connected to rotate said rotatable contact, an electromagnet controlled escapement mechanism for releasing said clock-work motor for stepwise rotation in response to an electrical control signal, means for connecting said electromagnet, said low resistance lamp, and a filament of a tube of said frequency converter in a series circuit, and further means for connecting the last said series combination between a terminal of said rectifier and the rotatable contact of said stepping switch, means for connecting a first of said fixed contacts of said stepping switch to the other terminal of said rectifier, means for connecting further ones of said fixed contacts of said stepping switch through corresponding ones of said coin responsive contacts to the other terminal of said rectifier, a plurality of relatively high resistance lamps, each said lamp being connected in parallel with a responsive one of said coin respective contacts, a paper record tape, a rotatable member engaging said tape for moving said tape, means for rotating said rotatable member in synchronism with said stepping switch, electrical contacts adjacent said tape for creating an electrical arc to mark said paper tape, a switch closable by the opening of said coin gate, means for connecting said switch and said arc creating contacts in a series circuit between the terminals of said filter resistor.

References Cited in the file of this patent

UNITED STATES PATENTS

| | | |
|---|---|---|
| 1,930,087 | Forney | Oct. 10, 1933 |
| 2,045,801 | Richter | June 30, 1936 |
| 2,073,330 | Zingg | Mar. 9, 1937 |
| 2,149,080 | Wolff | Feb. 28, 1939 |
| 2,579,983 | Thornton | Dec. 25, 1951 |
| 2,680,212 | Frazier | June 1, 1954 |
| 2,710,343 | Thompson | June 7, 1955 |
| 2,713,093 | Joerndt | July 12, 1955 |
| 2,732,923 | Parker | Jan. 31, 1956 |
| 2,746,589 | Rosenblom | May 22, 1956 |
| 2,769,023 | Loew | Oct. 30, 1956 |
| 2,769,024 | Del Riccio | Oct. 30, 1956 |
| 2,843,654 | Gottfried | July 15, 1958 |
| 2,854,506 | Pickles | Sept. 30, 1958 |